United States Patent [19]

Bolton

[11] Patent Number: 4,541,590

[45] Date of Patent: Sep. 17, 1985

[54] ROLL MEASURING DEVICE

[75] Inventor: James O. Bolton, Hillbank, Australia

[73] Assignee: The Commonwealth of Australia, Canberra, Australia

[21] Appl. No.: 400,086

[22] Filed: Jul. 20, 1982

[30] Foreign Application Priority Data

Jul. 24, 1981 [AU] Australia .............................. PE9910

[51] Int. Cl.$^4$ .............................................. F41G 7/00
[52] U.S. Cl. .................................................... 244/3.2
[58] Field of Search ................ 24/31, 3.15, 3.16, 3.17,
24/3.2, 3.21, 164; 356/141, 143, 152; 33/365,
366; 74/5, 5.6 A

[56] References Cited

U.S. PATENT DOCUMENTS

| | | | |
|---|---|---|---|
| 3,312,423 | 4/1967 | Welch | 244/3.2 |
| 3,439,170 | 4/1969 | Zagote et al. | 74/5.6 A |
| 3,451,643 | 6/1969 | Sargent et al. | 244/3.2 |
| 3,568,954 | 3/1971 | McCorkle | 244/3.2 |
| 3,746,281 | 7/1973 | Stripling | 244/3.2 |
| 4,027,399 | 6/1977 | Armstrong | 33/366 |
| 4,054,254 | 10/1977 | Cole | 244/3.21 |
| 4,063,366 | 12/1977 | Bane | 33/366 |
| 4,159,577 | 7/1979 | Bergkvist | 33/366 |
| 4,163,325 | 8/1979 | Hughes | 33/366 |
| 4,168,813 | 9/1979 | Pinson et al. | 244/3.15 |
| 4,172,994 | 10/1979 | Bergkvist | 324/175 |
| 4,253,242 | 3/1981 | McInerney | 33/366 |
| 4,262,861 | 4/1981 | Goldstein | 244/3.2 |

FOREIGN PATENT DOCUMENTS

| | | |
|---|---|---|
| 511872 | 12/1979 | Australia . |
| 399024 | 10/1942 | Italy ............................... 244/14 |
| 1230760 | 5/1971 | United Kingdom ............... 244/3.22 |
| 2060880 | 5/1981 | United Kingdom . |
| 1599242 | 9/1981 | United Kingdom . |

OTHER PUBLICATIONS

Avionics, *Stellar–Inertial Guidance Reduces Error*, by Horsfell, Aviation Week, Mar. 17 (1958), p. 73.

Cochan, *Analysis and Design of the Gyroscope*, pp. 1–7 and 76–77 (1963).

*Primary Examiner*—Charles T. Jordan
*Attorney, Agent, or Firm*—Cushman, Darby & Cushman

[57] ABSTRACT

A roll measuring device for missiles comprising an inertia member supported about an axis by a case and provided with means whereby rotation of the case relative to the inertia member about the said axis can be measured, the inertia member being balanced about the axis so as to be rotationally uninfluenced by gravity or movement medial or angular to the axes.

3 Claims, 3 Drawing Figures

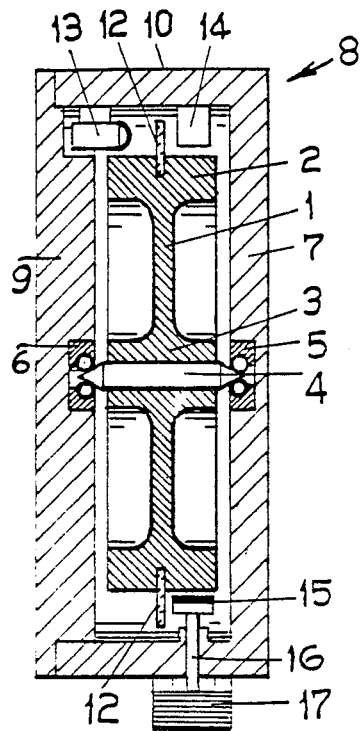
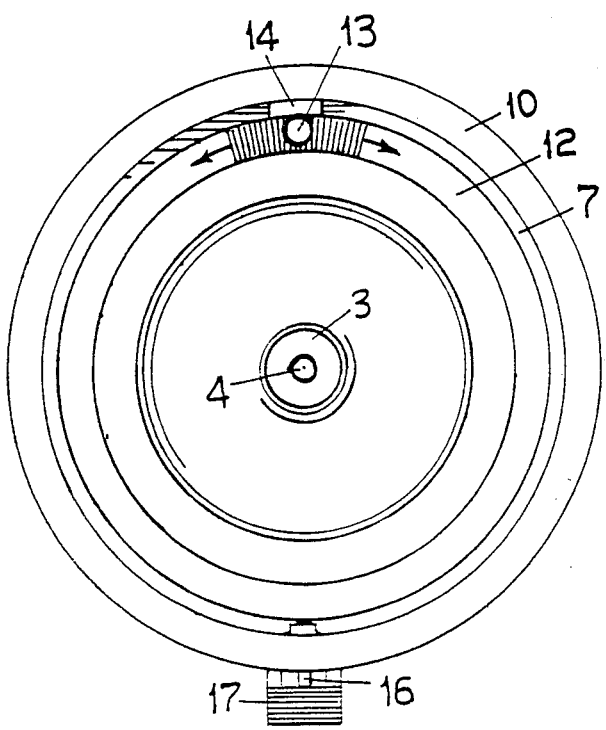
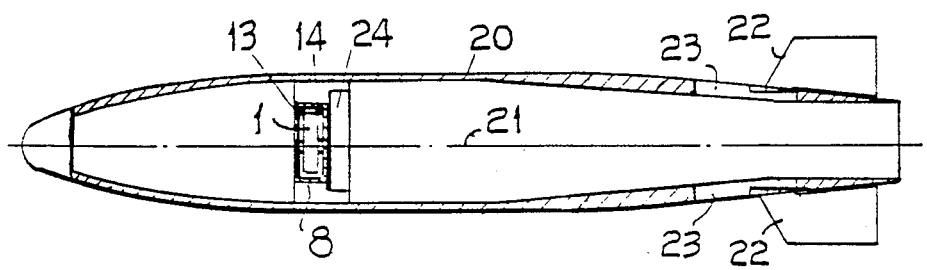
FIG. 1
FIG. 2
FIG. 3

ROLL MEASURING DEVICE

This invention relates to a roll measuring device and method of use and in particular it related to a device of the type which can determine the amount of roll occurring in a missile or similar object which rolls about a given axis or which is intended to be rolled about a given axis, the device having particular application, although not limited to this use, to a missile which upon release from a carrier must be orientated roll-wise to a particular orientation.

It is of course known to use gyroscopes for various purposes where deviation from a set path or orientation is to be measured but generally such devices require to be driven and are of a relatively intricate nature.

In the case of a missile it would be advantageous to have a device which does not require to be activated such as by driving the gyroscope to a relatively high speed prior to the device coming into operation, and it is an object of this invention to provide a simple and effective form of device which can measure roll about an axis and initiate correction factors or termination factors which may be necessary.

It is already known to rotationally mount a wheel in a case to read angular deviation and the following Prior Art shows examples of these.

Australian Patent Specification abridgement No. AU-B1-54,110/79, Shaw, shows a rotating dial in a casing and having means to measure angular deviations, but using a weighted spot to give a gravity reference.

U.S. Pat. No. 4,253,243, McInerney, shows a wheel in a casing, freely rotatable therein, but having gravity responsive loading, and including light detecting means.

U.S. Pat. No. 4,159,577, Bergkvist, shows a disc in a casing and means to measure rotation between the disc and the casing, but the disc includes a weight to render it gravity responsive.

U.S. Pat. No. 4,172,994, Bergkvist, shows a calibrated wheel with a light diode and phototransistor to indicate movement but the wheel is again weighted to be gravity actuated.

It will be realised that each of these devices have the wheel influenced by gravity, but also influenced by inertia forces such as yaw acting normal to or at an angle to the axis of the wheel.

It is a further object of this invention to provide a device which measures roll about an axis without forces medial to the axis of motion or angular thereto, or gravity, affecting the measurement.

The objects of the invention are achieved by utilizing a static inertia member such as a stationary wheel to measure angular position of its support means about the axis of the inertia member while limited angular displacement is occurring about the other two axes. Limited translation, acceleration and velocity of the case occur about all three axes, but the static inertia member is arranged in the case of a missile to have its axis parallel to the directional axis of the missile and by being fixed in a position parallel to this axis measures only the roll about this axis.

The method, when used to control the roll of a missile about a directional axis while limited angular displacement is occurring about the other two axes, comprises actuating control means on the missile from a signal generated between the inertia member and a support case on the missile, the inertia member being balanced about an axis parallel to the directional axis of the missile, the inertia member being static.

The method may also include braking means for indexing the inertia member relative to the case. The case can, of course, be a part of the missile structure and the term "case" includes an integral part of a missile structure.

The device can conveniently comprise a wheel statically balanced about its support bearings with its axis parallel to the weapon longitudinal axis, which is unlocked at the momemnt of release, or its position recorded on release, and is then used as a static roll reference. The device requires a high rotational inertia/mass ratio, protection from draughts, low bearing friction, and the position pick-off system that does not induce torque to the wheel and this can be conveniently achieved by graduated lines on the outer periphery of the wheel which intermittently chops light received by a light sensitive diode from a light emitting diode.

In this way roll of the case about the wheel, which itself does not roll because of its inertia and low co-efficient of friction of the bearing means, allows the degree of roll of the case to be measured and the exact angles of roll obtained to apply control forces through servo motors or the like to the fins of the missile or other actuation which is required to limit or correct roll factors.

When such a device is applied to a missile which on being released from its carrier is released in a position other than its flight angle, allows the orientation of the missile about is longitudinal axis to be corrected during the first few seconds of free fall of the missile by utilizing fins angled to achieve the required correction. By using the wheel which is the subject of this invention, the roll can be stopped immediately the required preset angle of roll has been reached, such as by indexing means between the wheel and its case, it having been found that a wheel will hold a stable position about its rotational axis for the required time to enable accurate sensing of the amount of roll which occurs.

To enable the invention to be fully appreciated an embodiment thereof will now be described with reference to the accompanying drawings in which:

FIG. 1 is a central sectional view through the device,

FIG. 2 is a face view thereof with the cover of the case removed, and

FIG. 3 is a diagrammatic view of a typical missile application, showing the missile case sectioned.

The wheel 1, which is the inertia member, has a rim 2 and a central boss 3 engaging a shaft 4 engaging low-friction bearings 5 and 6, the bearing 5 being supported in one wall 7 of a case 8, and the bearing 6 in a detachable wall 9 of the case 8 the case having a peripheral rim 10.

An annular disc 12 is carried by the wheel 1 and is transparent, and has lines or apertures to allow light to pass therethrough in a selected manner and has on one side a light emitting diode 13 and on the other side a light sensitive diode 14 which form the deflection measuring means between the wheel 1 and case 8.

The wheel 1 can be held against rotation if desired by a brake 15 having a stem 16 projecting through the rim 10 of the housing 8 and operated in any required manner such as by a solenoid 17.

The missile 20 shown diagrammatically in FIG. 3 has a directional axis 21 on which the case 8 is placed, 22 indicating control surfaces and 23 transducers actuated under control of a micro processor and algorithm 24 receiving the signal from the measuring means.

While reference herein is to a "wheel" it will be realized that while a circular balanced mass with a heavy rim 2 such as the wheel 1 is advantageous it would not always be necessary to use this form of device as any inertia mass could be used for the purpose provided its shape and suspension is such that it is balanced about its axis to be unaffected by gravity or forces normal to, or at an angle to, the axis about which measurement of angular displacement of the case is determined.

The device could also be associated with other sensing means which maintain the required orientation for a longer period but generally it is highly useful under conditions where for instance a missile is to be released in one position and rolled to another position prior to moving to its target, the device requiring no driving force and being active immediately any roll of the missile occurs and thus being a highly simplified form of control sensor free of driving means and having only the necessary measurement devices for recording the angle of roll which occurs.

It is sometimes necessary in the case for instance of a missile which is to be carried in a certain angular position and rolled on release to another angular position to preset the wheel 1 and lock it in its position so that on release it records when the exact angle of roll has been achieved, but such a release can comprise the simple brake 15 applied to the wheel 1 which brake 15 can be released simultaneously with the release of the missile from its carrier. The locking of the wheel of course is not essential because it can be left free and indexing means provided in association with light diodes 13 and 14 arranged to measure the position of the wheel 1 at the commencement of an operation and, as roll occurs, to initiate such controls as are required.

The claims defining the invention are as follows:

1. A roll measuring device for a missile released from an aircraft with relatively small velocity variation from that of the aircraft, comprising
   (a) a case non-rotationally secured to the missile about the missile flight axis,
   (b) an undriven inertia member in the said case, shaped so that its mass is balanced about a shaft extending along the said axis to be rotationally uninfluenced by gravity or movement medial or angular to the said axis,
   (c) a first low-friction bearing on a first side of the said inertia member supporting one end portion of the said shaft from the said case,
   (d) a second low-friction bearing on the other side of the said inertia member supporting the other end portion of the said shaft from the said case,
   (e) means to measure rotation of the said case about the said inertia member when the said missile is released from the aircraft whereby correction of the roll of the said missile about is flight axis can be controlled,
   (f) a brake between the said inertia member and the said case, and
   (g) means to release the brake when the said missile is released from the said aircraft.

2. A roll measuring device as in claim 1 including a wheel having a rim and axle boss balanced about a shaft, a case having low-friction bearings engaging the said shaft, an annular disc on the said wheel having indexing means to selectively vary light transmission between a light source and a light sensitive member both mounted on the said case.

3. A roll measuring device according to claim 1 wherein the means whereby rotation of the said case about the said inertia member is a light beam projected to receiving means to be selectively varied by the said inertia member when relative movement occurs about the said axis.

* * * * *